Oct. 14, 1924.
T. H. MANN
1,511,999
MOUTHPIECE FOR SMOKING PIPES
Filed April 30, 1923
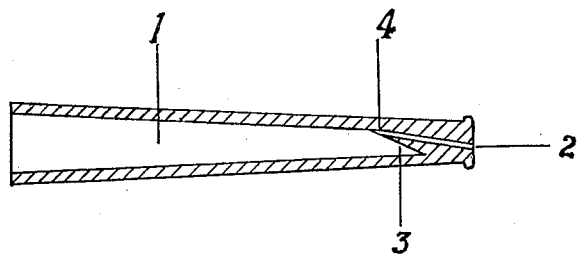
Witness:
Inventor:

Patented Oct. 14, 1924.

1,511,999

UNITED STATES PATENT OFFICE.

THOMAS HENRY MANN, OF SPREYDON, NEW ZEALAND.

MOUTHPIECE FOR SMOKING PIPES.

Application filed April 30, 1923. Serial No. 635,803.

*To all whom it may concern:*

Be it known that I, THOMAS HENRY MANN, a British subject, residing at 31 Wychbury Street, Spreydon, New Zealand, have invented new and useful Improvements in Mouthpieces for Smoking Pipes, of which the following is a specification.

This invention relates to mouthpieces for smoking pipes, and has for its object to provide such articles with an improved form of trap for preventing accumulated liquid or moisture from the smoke from passing into the mouth, and likewise, moisture from the mouth from passing freely into the stem, and to provide a free passage for a cleaner to the trap.

According to the invention the suction end of the mouthpiece is formed with a solid portion having a smoke passage communicating with the bore of the stem portion, but of less diameter than said bore, said passage at its inner end opening into the bore with a sloping mouth at a point near the upper side of the stem portion, its outer end opening at a lower point, so that an upwardly slanting smoke passage is produced at the suction end of the mouthpiece. A recess is formed below the inner end of the smoke passage in the solid portion, so that a trap is produced immediately below the passage end and adjacent to the suction end of the stem. The mouthpiece may be formed in any suitable manner, by moulding for example, and the solid portion may extend for any desired distance into the stem.

To enable the invention to be fully understood, it will now be described by reference to the accompanying drawing in which the stem portion of a pipe is shown in section constructed according to the invention.

As shown, the stem portion, 1, is formed at the suction end with a solid portion containing a passage, 2, which extends in a slanting direction up to the top of the stem. A recess, 3, is formed beneath the passage, 2, which acts as a trap. The slanting roof of the trap connects with the top of the bore at 4, the passage, 2, terminates at 4, its opening in line with the slanting roof of the trap. Moisture collects in the trap 3, and it will be seen that moisture from the mouth cannot readily pass into the stem owing to the shape of the passage, 2, while a cleaner will be unobstructed in its passage to the trap 3.

This invention may be applied to pipes of various patterns.

Having now particularly described and ascertained the nature of my said invention and in what manner the same is to be performed I declare that what I claim is:—

A mouthpiece for smoking pipes, having a recess near its suction end provided with a slanting roof formed by a solid portion having a smoke passage communicating with the bore and of less diameter than said bore, the passage slanting upwardly from its outer end and opening at its inner end near the upper side of the bore through the slanting roof of the recess, said recess acting as a trap formed beneath said smoke passage.

Dated at Christchurch the 8th day of January, 1923.

THOMAS HENRY MANN.

Witness:
F. I. COWLISHAW.